United States Patent [19]
Blundell et al.

[11] Patent Number: 5,958,993
[45] Date of Patent: Sep. 28, 1999

[54] FOG REDUCTION IN POLYURETHANE FOAM USING PHOSPHATE ESTERS

[75] Inventors: Cefn Blundell, Hilversum; Johan Antonie Wuestenenk, Zelhem, both of Netherlands

[73] Assignee: Akzo Novel nv, Arnhem, Netherlands

[21] Appl. No.: 08/793,439

[22] PCT Filed: Aug. 29, 1995

[86] PCT No.: PCT/EP95/03397

§ 371 Date: Apr. 18, 1997

§ 102(e) Date: Apr. 18, 1997

[87] PCT Pub. No.: WO96/06885

PCT Pub. Date: Mar. 7, 1996

[30] Foreign Application Priority Data

Aug. 30, 1994 [EP] European Pat. Off. ............. 94202474

[51] Int. Cl.⁶ .................................................. C08G 18/04
[52] U.S. Cl. ........................... 521/168; 521/155; 521/169
[58] Field of Search ..................... 521/168, 169, 521/155

[56] References Cited

U.S. PATENT DOCUMENTS

| | | |
|---|---|---|
| 2,952,701 | 9/1960 | McConnell et al. . |
| 3,412,051 | 11/1968 | Baranauckas et al. . |
| 3,492,373 | 1/1970 | Matson et al. . |
| 3,764,640 | 10/1973 | Klose . |
| 3,869,526 | 3/1975 | Combey et al. . |
| 4,049,617 | 9/1977 | Albright ................................. 521/168 |
| 4,133,846 | 1/1979 | Albright ................................. 521/169 |
| 4,199,534 | 4/1980 | Fearing ................................. 521/169 |
| 4,203,888 | 5/1980 | Rashbrook . |
| 4,414,104 | 11/1983 | Delaney et al. . |
| 4,458,035 | 7/1984 | Hardy et al. ............................ 521/169 |
| 4,746,682 | 5/1988 | Green ..................................... 521/107 |
| 5,328,938 | 7/1994 | Wishneski et al. ..................... 521/174 |
| 5,621,029 | 4/1997 | Eckel et al. ............................. 524/127 |
| 5,728,746 | 3/1998 | Sicken ..................................... 521/169 |

FOREIGN PATENT DOCUMENTS

| | | |
|---|---|---|
| 0 224 979 | 6/1987 | European Pat. Off. . |
| 2 338 283 | 8/1977 | France . |
| 2 061 949 | 5/1981 | United Kingdom . |

OTHER PUBLICATIONS

*Derwent Abstract*, JP 063062, Nov. 1, 1994.
*Abstract*, JP 7122584, Jun. 28, 1971.
*Abstract*, JP 7174331, Oct. 27, 1982.
*International Search Report*, dated Jan. 15, 1996.

*Primary Examiner*—John M. Cooney, Jr.
*Attorney, Agent, or Firm*—Dilworth & Barrese; Ralph J. Mancini

[57] ABSTRACT

A process for imparting flame retardancy to a polyurethane foam comprising the step of incorporating in said polyurethane foam 0.5–50.0 php of at least one flame-retardant phosphate ester is disclosed. Also disclosed is a flame-retardant polyurethane foam composition which comprises a polyurethane foam and 0.5–50.0 php of at least one flame-retardant phosphate ester, as well as the use of a flame-retardant phosphate ester to impart flame retardancy to a polyurethane foam. An example of such a phosphate ester is resorcinol bis(diphenyl phosphate). These flame retardants have the advantage that they reduce fogging caused by evaporation of volatile components from polyurethane foam compositions.

9 Claims, No Drawings

FOG REDUCTION IN POLYURETHANE FOAM USING PHOSPHATE ESTERS

FIELD OF THE INVENTION

The present invention relates to anti-fogging flame retardants useful in polyurethane foams and to a process for imparting flame retardancy to a polyurethane foam by incorporating such anti-fogging flame retardants into the polyurethane foam.

BACKGROUND OF THE INVENTION

U.S. Pat. No. 4,746,682 to J. Green relates to a polyurethane flame retardant containing a polybrominated diphenyl oxide and an alkylated triaryl phosphate ester.

Certain disclosures exist in the prior art in regard to organic diphosphates of the general class

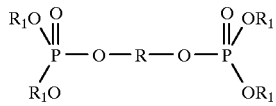

where R can be substituted or unsubstituted alkylene, arylene, alkylene arylene, or other divalent connecting radical (e.g., diphenylene sulfone -SO-, -S-, -SO$_2$-), and the like and R$_1$ can be substituted or un-substituted aryl or alkyl. Examples of some disclosures include the following: U.S. Pat. Nos. 3,492,373; 3,869,526 and 4,203,888; British Patent No. 2,061,949; and Japanese Patent Publication Nos. 57/174,331; 71/22,584; 74/40,342 and 82/55,947.

Also relating to this class of compounds are copending U.S. patent application Ser. No. 374,717, filed Jul. 3, 1989, entitled "Novel Aromatic Bisphosphated" which covers compounds where R$_1$ is aryl and R is —C$_6$H$_4$SO$_2$H$_4$— and U.S. patent application Ser. No. 374,716, filed Jul. 3, 1989, also entitled "Novel Aromatic Bisphosphates" which covers compounds where R$_1$ is also aryl and R is a neopentyl group of a halogenated neopentyl group.

U.S. Pat. No. 4,049,617 discloses a group of flame retardant phosphorus esters containing one to three 1,3,2-dioxophosphorinane rings. These flame retardants contain an hydroxyl radical so that they are capable of reacting into the polymeric chain of, e.g., polyurethane, thereby imparting a durable flame retarded polymeric composition.

Most of these flame retardants suffer from the drawback that when incorporated in polurethane compositions, they are too volatile or contain volatile impurities which will be released when the polyurethane is heated. This is becoming an increasingly significant problem in the automobile industry because the new aerodynamic designs employ, for example, a flatter windscreen which increases the surface area of sun penetration into the auto on warm, sunny days, This often leads to internal temperatures above 100° C. and thus evolution of volatile products from polyurethane parts in the auto. These volatile products produce a thin film in the auto which is particularly noticeable on the windscreen. This phenomena has been termed, "fogging".

Automakers are beginning to demand polyurethanes which exhibit significantly less fogging in order to eliminate this problem. Accordingly, there is a need for flame retardant compositions which provide adequate flame retardancy in polyurethane foam compositions and reduce the amount of fogging which occurs upon heating of these compostions. This and other objects of the present invention will become apparent from the summary and detailed description which follow.

SUMMARY OF THE INVENTION

The present invention relates to a process for imparting flame retardancy to a polyurethane foam comprising the step of incorporating in said polyurethane foam 0.5–50.0 php (php=parts per hundred polyol) of at least one flame retardant phosphate ester represented by the formulas I–III:

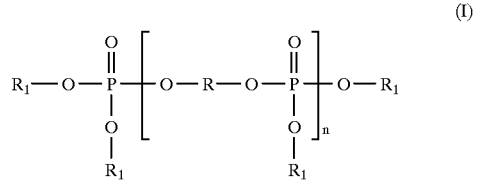
(I)

wherein n=1–10; R is selected from linear or branched C$_2$–C$_{20}$ alkyl, and C$_6$–C$_{20}$ aryl, optionally halogenated; and each R$_1$ is independently selected from linear or branched C$_1$–C$_{10}$ alkyl, C$_6$–C$_{20}$ aryl, and C$_7$–C$_{30}$ aralkyl, the aryl and aralkyl groups being optionally halogenated;

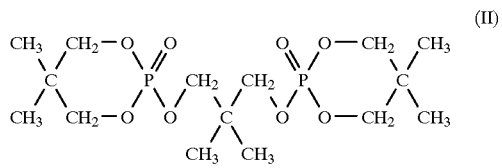
(II)

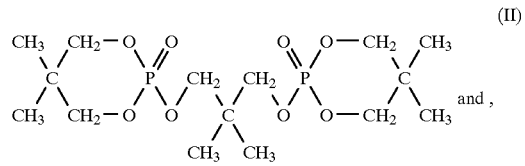
(II)

and,

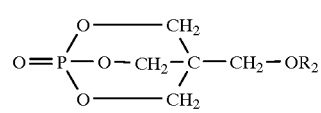
(III)

wherein R$_2$ is selected from hydrogen, C$_6$–C$_{20}$ aryl, C$_6$–C$_{20}$ substituted aryl, -P(O)(OR$_1$)$_2$ wherein R$_1$ is as defined above, and the group:

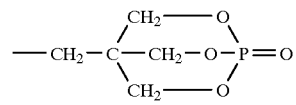

In a second aspect, the present invention relates to polyurethane foam compositions which comprise 0.5–50.0 php of at least one flame retardant phosphate ester represented by the * Finally, the present invention also relates to the use of phosphate esters of the formula I as flame retardants in polyurethane foam.

Compounds of the formulas I–III and methods for making them are known. For example, the product Fyrolflex® RDP (ex. Akzo Nobel Chemicals) is commercially available for use as a flame retardant plasticizer in thermoplastic resins such as nylons, polyesters, polycarbonates and blends thereof. It is known to demonstrate excellent thermal stability and compatibility with thermoplastic resins. Further, the compound of the formula I where n=1, which is known as phosphoric acid 1,3-phenylene tetraphenyl ester or resorcinol bis(diphenyl phosphate), has CAS Registry Number 57583-54-7. Thus, methods for making this compound and its higher oligomers (n=2–10) are known in the art.

* formulas I–III, which are defined as above.

Preferred are compounds of the formula I. More preferred are compounds of the formula I wherein $R_1$ is a $C_6$–$C_{20}$ aryl group, optionally halogenated. The preferred compounds for use in the present invention are resorcinol bis(diphenyl phosphate), neopentyl glycol bis(diphenyl phosphate), propylene glycol bis(diphenyl phosphate), bisphenol A bis-(diphenyl phosphate), and mixtures thereof. Resorcinol bis-(diphenyl) phosphate is the most preferred flame retardant for use in the present invention. In the present invention, 0.5–50.0 php of the flame retardant of the formulas I–III is employed in a polyurethane foam to impart flame retardancy thereto. More preferably, 3–25 php of the flame retardant is employed and, most preferably, 4–15 php of the flame retardant is used. These amounts of the flame retardants of the present invention not only impart some flame retardancy to the polyurethane but they also reduce the amount of fogging as compared to the same polyurethane without flame retardant and/or including other flame retardant compounds.

The present invention is applicable to all polyurethanes. However, it is preferred that the present invention be applied to polyurethanes derived from aromatic isocyanates such as toluene diisocyanate and diphenylmethane diisocyanate. The second component of the polyurethanes is a polyol, preferably selected from polyetherpolyols and polyesterpolyols, with polyurethanes derived from polyetherpolyols being preferred due to their processing ease. In the most preferred embodiment, the present invention is applied to flexible polyurethane foams since this type of polyurethane foam is typically used in applications where fogging problems must be eliminated.

The flame retardants of the present invention are generally incorporated in the polyurethane by mixing them in during the production of the polyurethane. The present flame retardants are thereby homogeneously mixed into the foam matrix. Methods for polyurethane production are well known to those of skill in the art.

Other additives can be incorporated into the polyurethane foam along with the flame retardants of the present invention. More particularly, a catalyst is typically employed in the production of flexible polyurethane foams. Such catalysts are generally a mixture of one or more tertiary amines with an organo-tin catalyst.

Further, chain extenders and/or cross-linking agents may also be employed in the polyurethane foam production process in order to tailor the properties of the foam to the application for which it will be used. For example, using chain extenders the modulus and the glass transition temperature can be raised and using cross-linking agents, the foam can be made harder and stronger.

Of course, a foaming agent is required in the production of polyurethane foams, such as, for example, water.

Another component in the polyurethane foam is the surface active agent which is generally employed to improve the mixability of the reaction mixture and to stabilize the gas bubbles thereby providing more uniform cells in the foam. Typical surface active agents include polysilicones and the type and amount of polysilicone is chosen on the basis of the type of foam that is desired.

The polyurethane foam may also include both organic and inorganic coloring agents which both provide the desired foam color and offer some protection against ultraviolet light. Carbon black is a typical coloring agent employed in such foams. The foam may also include one or more fillers in order to make the foam heavier and/or stronger. Fibrous and inorganic mineral fillers may be used in this application.

Finally, it is possible to combine the flame retardants of the formulas I–III of the present invention with one or more conventional flame retardants used in polyurethane foams whereby the increase in fogging caused by the conventional flame retardants can be offset by the flame retardants of the present invention. Typical flame retardants which can be used are halogenated diphenyl oxides, haloalkyl phosphates and phosphonate flame retardants such as those which are commercially available for use in polyurethane foams.

The invention will be further illustrated by the following examples.

Test Methods

Fogging was measured according to DIN 7520 using the gravimetric method. The limiting oxygen index (LOI) was measured according to ISO 4589. The automotive flame test was carried out according to MVSS 302. The rise time is the time at which the foam ceases to rise during its production.

The air flow test measures the ease with which air flows through the cellular polyurethane structure. In this manner, the openness of the cells can be determined. The test samples were 51 mm×51 mm×25 mm. The sample is placed in an opening and the amount of air stream required to produce a pressure drop of 12.70 mm water over the sample is measured.

Polyurethane Foam Production Method

The polyol, flame retardant, water, amine catalysts and the stabilizer were mixed, with stirring, in a first beaker. In a separate beaker, the toluene diisocyanate (TDI) was weighed out. The box wherein the foam will be made was prewarmed and the organo-tin catalyst was put into a syringe. The first beaker was stirred at 1800 revolutions per minute for a period of 5 seconds and then the organo-tin catalyst was dosed thereto while stirring was continued. After a total of 21 seconds of stirring, the TDI was added to the mixture. Stirring was then continued for an additional 9 seconds and the still fluid mixture was quickly put into the box. Then the rise time was measured. Once the foam ceased to rise, it was subjected to an additional 10 minutes at 110° C. to ensure that the reaction was completed.

Example 1

Comparative Examples A–B

A polyurethane foam formulation was prepared from 100 parts of Lupranol® 2030, 3.5 php water, 12 php of the flame retardant mentioned in Table 1, 0.15 php Dabco® 33LV, 0.05 php Dabco® BL11, 1.2 php Tegostab® B3640, 0.4 php Dabco® T10 and 46.57 php of toluene diisocyanate (110 index). The fogging, rise time, limiting oxygen index (LOI), specific gravity, and direct air flow for these materials were measured and the results are presented in Table 1. Further, these compositions were subjected to the automotive flame test and it was found that the composition in accordance with the present invention (Example 1) was self-extinguishing.

TABLE 1

| Example | Flame Retardant | Fogging (mg) | rise time | LOI (% O$_2$) | specific gravity | automotive flame test | air flow direct |
|---|---|---|---|---|---|---|---|
| A | none | 0.9–1.0 | 97 | 18.8 | — | B/RB | — |
| B | Phosflex ® | 1.2–1.9 | 72 | 21.8 | 33.7 | SE | 42.5 |
| 1 | RDP | 0.4–0.6 | 150 | 21.2 | 33.0 | SE | 17.5 |

B/RB = Burned
SE = Self-extinguishing
LOI = Limiting Oxygen Index

These results clearly show that the flame retardant of the present invention leads to less fog than the prior art flame retardant and even produces a reduction in fogging when compared to the control which contained no flame retardant.

Examples 2–5

Comparative Examples 2a–5a and 4b

In these examples, polyurethane foams were prepared from 4 different polyols as are given in Table 2. The foam formulations are the same as for Example 1 except that different polyols were employed. Examples 2a–5a are control examples wherein the fogging of polyurethane foams containing no flame retardant were measured and the results appear in Table 2 under the heading, "control." Examples 2–5 incorporate 12 php of resorcinol bis(diphenyl phosphate). Δ Fog is the difference between the amount of fogging from the control example and the amount of fogging for the same composition including 12 php of the flame retardant of the present invention. The results appear in Table 2.

TABLE 2

| | | Fogging in mg | | |
|---|---|---|---|---|
| Example | Polyol in Polyurethane Foam | Control | RDP (12 php) | ΔFog |
| 2–2a | Caradol ® 1080 | 1.7 | 1.1 | −0.6 |
| 3–3a | Caradol ® 36-3 | 1.0 | 0.5 | −0.5 |
| 4–4a | Caradol ® 48-2 | 2.0 | 1.5 | −0.5 |
| 4b | Caradol ® 48-2 | 2.0 | | +0.2–0.3 |
| 5–5a | Lupranol ® 2030 | 0.9 | 0.5 | −0.4 |

RDP = Resorcinol bis(diphenylphosphate)
Example 4b was performed using Armguard ® V6, a commercially available flame retardant for polyurethane foams.

The results in Table 2 demonstrate that the flame retardants of the present invention actually produce a net reduction in fogging when added to a polyurethane foam whereas one would expect a net increase in fogging when a flame retardant is added.

Examples 6–8

The polyurethane foam formulation of Example 1, containing as polyol, Caradol® 48-2, was tested with three different amounts of resorcinol bis(diphenyl phosphate) [RDP] flame retardant. The results are given in Table 3.

TABLE 3

| Example | RDP (php) | Δ FOG in mg |
|---|---|---|
| 6 | 12 | −0.5 |
| 7 | 6 | −0.5 |
| 8 | 2 | 0 |

The results in Table 3 demonstrate that different amounts of the flame retardant of the present invention produce the unexpected effect that there is either no net increase in fogging due to the addition of the flame retardant, or, at higher concentrations, a net decrease in fogging can be realized.

Example 9

Comparative Examples C–D

In these examples, the formulation of Example 1 was tested using flame retardants at 12 php levels in a polyurethane foam derived from Lupranol® 2030. The results are given in Table 4.

TABLE 4

| Example | Flame Retardant | Δ FOG in mg |
|---|---|---|
| C | Antiblaze ® 100 | 1.4 |
| D | DEG-CEP | 0.6–1.1 |
| 9 | NPG-TPP | 0.1–0.3 |

Antiblaze® 100 is a commercially available polyurethane flame retardant. DEG-CEP is a diethylene glycol based chloroethyl phosphate. NPG-TPP is neopentyl glycol bis (diphenyl phosphate).

From the results in Table 4 one can see the expected significant increase in fogging which is normally a side-effect of incorporating conventional flame retardants into polyurethane foams. In comparison, the flame retardant in accordance with the present invention demonstrate a reduced fogging when compared to Antiblaze® 100 and DEG-CEP. These results clearly demonstrate that the fogging reduction achieved by the flame retardants of the present invention is significant and unexpected.

Examples 10–11

In these examples, the formulation of Example 1 was employed except that Lupranol® 2030 was replaced by the polyol Caradol® SC-5602, the amount of flame retardant in accordance with the present invention was reduced to 8 php and the flame retardants propylene glycol bis(diphenyl phosphate) (PG-TPP) and bisphenol A bis(diphenyl phosphate) (BPA-TPP) were employed in the tests. The results are given in Table 5.

TABLE 5

| Example | Flame Retardant | Δ FOG in mg |
|---|---|---|
| 10 | PG-TPP | 0.28–0.38 |
| 11 | BPA-TPP | 0–0.2 |

From the results in Table 5 one can see that other flame retardants in accordance with the present invention also give an unexpectedly good reduction in fogging.

Example 12

Example 10 was repeated except that 6 php of PG-TPP was employed. The results are given in Table 6.

TABLE 6

| Example | Flame Retardant | Δ FOG in mg |
|---|---|---|
| 12 | PG-TPP | 0.16–0.35 |

The foregoing examples were presented for the purpose of illustration and description only and are not to be construed as limiting the invention in any way. The scope of the invention is to be determined from the claims appended hereto.

What is claimed is:

1. A process for imparting flame retardancy to a polyurethane foam comprising the step of incorporating in said polyurethane foam 0.5–50.0 php of at least one flame retardant phosphate ester represented by the formula:

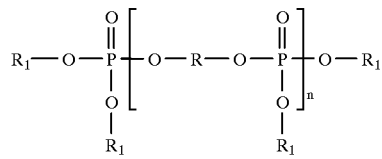

wherein n=1–10; is selected from linear or branched $C_2$–$C_{20}$ alkyl, and $C_6$–$C_{20}$ aryl, optionally halogenated; and each is independently selected from $C_6$–$C_{20}$ aryl groups, the aryl groups being optionally halogenated.

2. The process of claim 1 wherein 3–25 php of said at least one flame retardant phosphate ester is employed.

3. The process of claim 1 wherein in said process a second flame retardant other than said at least one flame retardant phosphate ester is incorporated into said polyurethane foam.

4. The process of claim 3 wherein said second flame retardant is selected from the group consisting of halogenated diphenyl oxides, haloalkyl phosphates and phosphonate flame retardants.

5. The process of claim 1 wherein said at least one flame retardant phosphate ester is resorcinol bis(diphenyl phosphate).

6. A flame retardant polyurethane foam composition which comprises a polyurethane foam and 0.5–50.0 php of at least one anti fogging flame retardant phosphate ester represented by the formula:

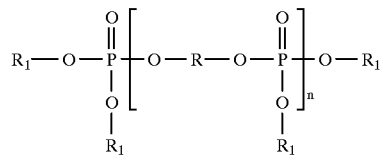

wherein n=1–10; R is selected from linear or branched $C_2$–$C_{20}$ alkyl, and $C_6$–$C_{20}$ aryl, optionally halogenated; and each $R_1$ is independently selected from $C_6$–$C_{20}$ aryl groups, the aryl groups being optionally halogenated.

7. The composition of claim 6 which comprises 3–25 php of said at least one flame retardant phosphate ester.

8. The composition of claim 6 which comprises a second flame retardant other than said at least one flame retardant phosphate ester.

9. The composition of claim 6 wherein said at least one flame retardant phosphate ester is resorcinol bis(diphenyl phosphate).

\* \* \* \* \*

UNITED STATES PATENT AND TRADEMARK OFFICE
CERTIFICATE OF CORRECTION

PATENT NO. : 5,958,993
DATED : September 28, 1999
INVENTOR(S) : BLUNDELL, et al.

It is certified that error appears in the above-indentified patent and that said Letters Patent is hereby corrected as shown below:

In claim 1, line 26 please replace the word "alkyl" with --alkylene--.

In claim 1, line 26 please replace the word "aryl" with --arylene--.

In claim 1, line 26 please add --$R_1$-- after "and each".

In claim 6, line 21 please replace the word "alkyl" with --alkylene--.

In claim 6, line 21 please replace the word "aryl" with --arylene--.

Signed and Sealed this

Twenty-fourth Day of October, 2000

Q. TODD DICKINSON

*Attest:*

*Attesting Officer*  *Director of Patents and Trademarks*